Aug. 2, 1927.
J. H. MORIARTY
1,637,956
TESTING APPARATUS
Filed June 1, 1925
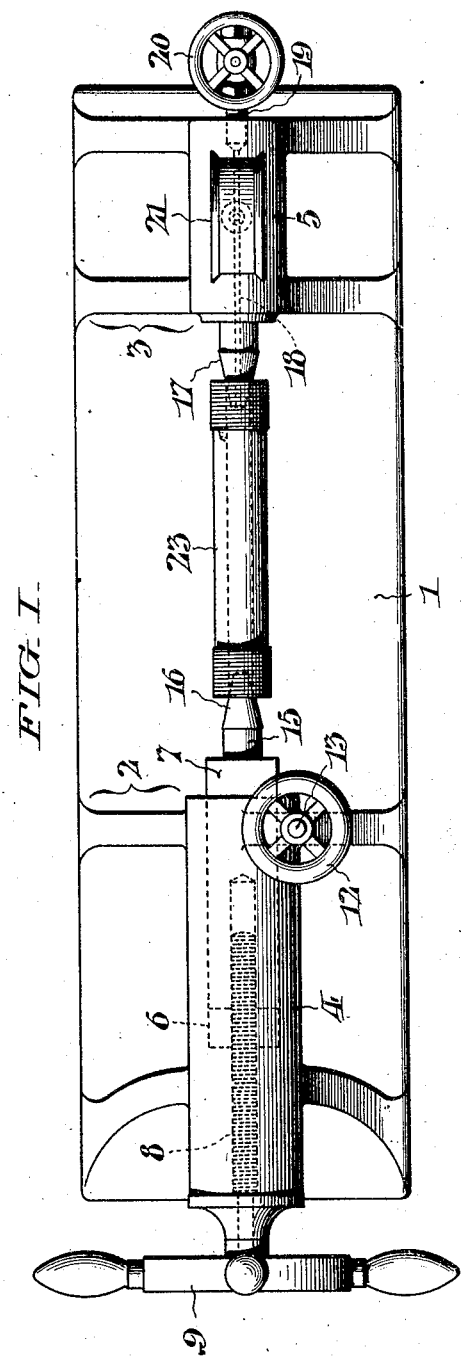
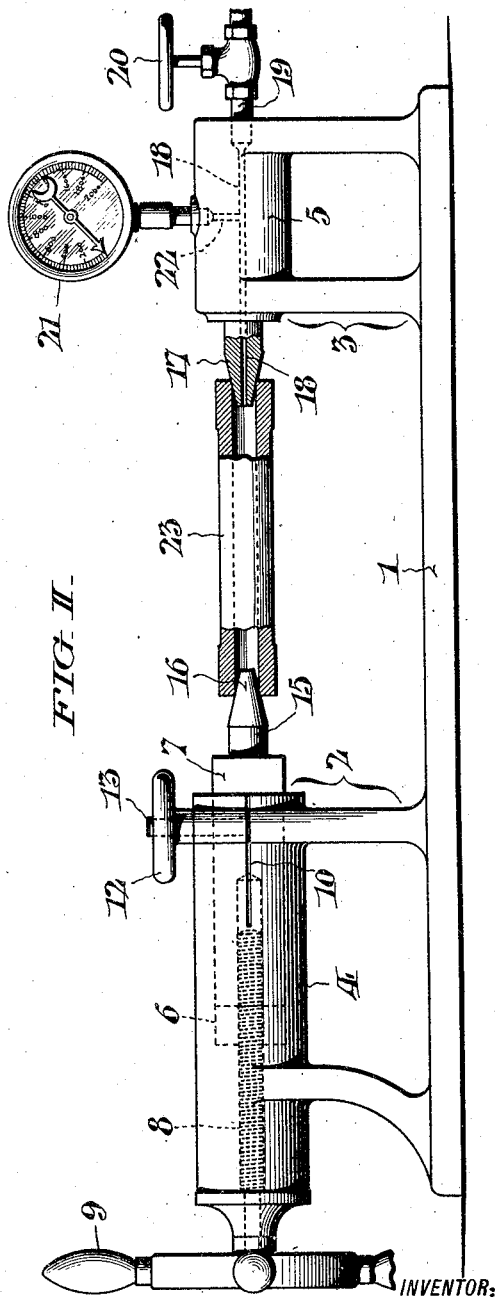
INVENTOR:
John H. Moriarty,
WITNESSES:
ATTORNEYS.

Patented Aug. 2, 1927.

1,637,956

UNITED STATES PATENT OFFICE.

JOHN HENRY MORIARTY, OF BUFFALO, NEW YORK, ASSIGNOR TO THE BARBER ASPHALT COMPANY, OF PHILADELPHIA, PENNSYLVANIA, A CORPORATION OF WEST VIRGINIA.

TESTING APPARATUS.

Application filed June 1, 1925. Serial No. 33,988.

The invention relates to testing apparatus, and more particularly to machines of this class especially adapted for testing tubular devices such as hollow stay bolts and the like.

According to my invention, the tubes to be tested, are supported between a pair of trammel projections, formed preferably with conical tips which engage within, and seal the ends of the tubes. One of these trammel projections is fixed, and the other relatively movable to permit mounting of tubes of varying lengths and at the same time, to insure the proper sealing of the tube ends and to thus maintain them during the testing operation. The stationary trammel projection is communicative, through an axial duct, with a source of pressure fluid, such as a hydraulic pump or air compressor, means being incidentally provided for controlling the pressure, and also an auxiliary means for recording the results of the test.

The invention is therefore directed to a testing apparatus comprehending the features above outlined, and having its various constituent elements so simplified as to operation and arrangement, that the tests may be performed with surety and accuracy with a minimum time expenditure.

The organization which is typical of my invention, and by which I attain the ends above enumerated will be best understood from the detailed description which follows.

In the drawings, Fig. I, is a plan view of a testing apparatus conveniently illustrating my invention; and, Fig. II, is a side elevation of the same.

The device is supported upon a base 1, having the elongated quadrangular configuration clearly shown in Fig. I. At its ends, the base 1 is supplemented with integral standards or abutments 2 and 3, which serve to sustain at an elevation, the reaction heads 4 and 5, respectively. These heads 4, 5 are co-axially aligned and lie in the vertical plane intersecting the longitudinal center line of the base 1. The inner end of the head 4, is formed with an opening 6, for the reception and guidance of a slide block 7, adapted for longitudinal adjustment through the instrumentality of a feed screw 8, which is restricted to rotative movement under support of said head, and provided upon its protruding end with a hand wheel 9. The head 4, is split as at 10, to afford a means for clamping the slide block 7, in its adjusted positions and to prevent displacement after the desired setting has been secured. This clamping action may be conveniently accomplished by a hand wheel 12, which is co-operatively associated with a screw threaded bolt 13, having a fixed anchorage below the line of division of the head 4. The exposed end of the slide block 7, is supplemented with an axial trammel projection 15, having a conical tip or point 16, adapted to engage within the end of the tube under test, as will be later explained.

The head 5, is provided with a corresponding opposed and fixed trammel in the form of a conical inward projection 17, which is in longitudinal alignment with the co-operative trammel projection 15. The projection 17, and the head 5 are traversed by an axial duct 18, which, through a line pipe 19, is connected to a source of a pressure fluid. The fluid supply is controlled by a hand valve 20, interposed in the pipe 19, and the pressure recorded by a gauge 21, communicating with the duct 18, through a branch duct 22.

In operation, one end of the tubular stay bolt 23, is first placed over the conical trammel projection 17, of the head 5, and the screw 8, rotated under propulsion of the hand wheel 9, until the opposing trammel projection 15, is well forced into the opposite end of said tubular stay bolt. After this condition has been obtained, the ends of the tubular stay bolt become effectively sealed, and are thus maintained during the testing operation, by securely clamping the slide block 7, against displacement by manipulation of the hand wheel 12. The valve 20, is thereupon opened and the pressure test determined under the recordings of the gauge 21.

By the simplicity of the arrangement herein disclosed, short tubular devices such as hollow stay bolts, may be accurately tested with a minimum expenditure of time.

Having thus described my invention, I claim:

1. An apparatus for tube testing, including in combination, a pair of abutments integral with a common base between which the tube is supported, said abutments comprising co-axially aligned trammel projections one of which is adjustable relative to the other adapted to engage within the ends of the tube and to seal the same; and means for supplying a pressure medium to the interior of the tube while thus supported.

2. An apparatus for tube testing, including in combination, a pair of abutments integral with a common base between which the tube is supported, said abutments comprising co-axially aligned trammel projections adapted to engage within the ends of the tube and to seal the same; means whereby said trammel projections may be relatively adjusted; and means for supplying a pressure medium to the interior of the tube, while thus supported.

3. An apparatus for tube testing, including a pair of abutments integral with a common base between which the tube is supported; an integral trammel projection formed upon one of said abutments and adapted to engage within one end of the tube and to seal the same; a co-operative trammel projection adjustably secured in the other of said abutments and adapted to engage within, and to seal the opposite end of said tube; and means for supplying a pressure medium to the interior of the tube, while thus supported.

4. An apparatus for tube testing, including, a pair of abutments integral with a common base between which the tube is supported; an integral trammel projection formed upon one of said abutments and adapted to engage within one end of the tube, and to seal the same; a co-operative trammel projection adapted to engage within, and to seal the opposite end of the tube, said co-operative trammel projection being slidably mounted in the other of said fixed abutments; a feed screw whereby the last mentioned trammel projection may be adjusted; and means for supplying a pressure medium to the interior of the tube, while thus supported.

5. An apparatus for tube testing, including a pair of abutments integral with a common base between which the tube is supported; an integral trammel projection formed upon one of said abutments and adapted to engage within one end of the tube and to seal the same; a co-operative trammel projection adapted to engage within, and to seal the opposite end of the tube, said co-operative trammel projection being slidably mounted in the other of said fixed abutments; a feed screw whereby the last mentioned trammel projection may be axially adjusted; means for securing said trammel projection in adjusted positions; and means for supplying a pressure medium to the interior of the tube, while thus supported.

6. An apparatus for tube testing, including in combination, a fixed trammel projection and a co-operative, relatively adjustable trammel projection both integral with a common base adapted to engage within the ends of the tube to support and seal the same; and means whereby a pressure medium may be supplied to the interior of the supported tube, through an axial duct in the said fixed trammel projection.

In testimony whereof, I have hereunto signed my name at Buffalo, N. Y., this twenty-sixth day of May, 1925.

JOHN HENRY MORIARTY.